(12) United States Patent
Grasmueck

(10) Patent No.: US 8,941,816 B2
(45) Date of Patent: Jan. 27, 2015

(54) ROTARY LASER POSITIONING FOR GEOPHYSICAL SENSING

(75) Inventor: Mark Grasmueck, Miami, FL (US)

(73) Assignee: National Science Foundation, Arlington, VA (US)

( * ) Notice: Subject to any disclaimer, the term of this patent is extended or adjusted under 35 U.S.C. 154(b) by 1062 days.

(21) Appl. No.: 11/381,159

(22) Filed: May 2, 2006

(65) Prior Publication Data

US 2007/0258325 A1 Nov. 8, 2007

(51) Int. Cl.
*G01C 3/08* (2006.01)
(52) U.S. Cl.
USPC ........................................... 356/3.12; 367/77
(58) Field of Classification Search
USPC ................ 367/56, 119, 129, 77, 24; 342/459; 356/3.1–3.16, 3.12
See application file for complete search history.

(56) References Cited

U.S. PATENT DOCUMENTS

| | | | | |
|---|---|---|---|---|
| 4,820,041 | A * | 4/1989 | Davidson et al. | 356/3.12 |
| 5,100,229 | A * | 3/1992 | Lundberg et al. | 356/3.12 |
| 5,471,218 | A * | 11/1995 | Talbot et al. | 342/357.03 |
| 5,550,787 | A * | 8/1996 | Rialan et al. | 367/77 |
| 5,563,847 | A * | 10/1996 | Grouffal et al. | 367/65 |
| 5,579,102 | A * | 11/1996 | Pratt et al. | 356/3.12 |
| 5,629,626 | A * | 5/1997 | Russell et al. | 324/345 |
| 6,369,755 | B1 * | 4/2002 | Nichols et al. | 342/357.17 |
| 6,643,004 | B2 * | 11/2003 | Detweiler et al. | 356/141.4 |
| 6,700,526 | B2 | 3/2004 | Witten | |
| 6,766,253 | B2 * | 7/2004 | Burns et al. | 702/6 |
| 2007/0139262 | A1 * | 6/2007 | Scherzinger | 342/357.02 |

OTHER PUBLICATIONS

Young, et al. "A hybrid laser-tracking/GPS location method allowing GPR acquisition in rugged terrain." The Leading Edge, May 2002.*
Annan, A.P., et al; Application of GPR to Map Concrete to Delineate Embedded Structural Elements and Defects; Internatonal Society for Optical Engineering (SPIE) Proceedings, 4758, 359-364, 2002.
Annan, A.P.; Practical Processing of GPR Data; Sensors & Software, Inc., 1999.
Birkin, R., et al; Efficient Large-Scale Underground Utility Mapping in New York City Using a Multi-Channel Ground-Penetrating Imaging Radar System; International Society for Optical Engineers (SPIE) Proceedings, 4758, 186-191, 2002.
Butler, D.K., et al; Overview of Multimethod Geophysical System Development for Enhanced Near-Surface Target Detection, Discrimination and Characterization; The Leading Edge 25(3), 352-356, 2006.

(Continued)

*Primary Examiner* — Mark Hellner
(74) *Attorney, Agent, or Firm* — Steven M. Greenberg, Esq.; CRGO Law

(57) ABSTRACT

Embodiments of the present invention address deficiencies of the art in respect to positioning for geophysical sensing and provide a method, system and apparatus for rotary laser positioning in geophysical sensing. In an embodiment of the invention, a geophysical sensing data processing system can be provided to include multiple laser energy sources disposed about a target scene, and a mobile sensor unit. The mobile sensor unit can include at least one laser energy source sensor coupled to a laser positioning system, and one or multiple geophysical sensor communicatively linked to the laser positioning system. In one aspect of the invention, the laser positioning system can be a Rotary Laser Positioning System (RLPS). Complementary positioning sensors further can be provided.

7 Claims, 2 Drawing Sheets

(56) References Cited

OTHER PUBLICATIONS

Grasmueck, M., et al; Full-Resolution 3-D GPR Imaging; Geophysics, vol. 70, p. K12-K19, 2005.

Lehmann, F., et al; Semiautomated Georadar Data Acquisition in Three Dimensions; Geophysics, 64, 719-731, 1999.

Roberts, R., et al: Enhanced Target Imaging in 3D Using GPR Date from Orthogonal Profile Lines; International Society for Optical Engineering (SPIE) Proceedings, 4758, 256-261, 2002.

Streich, R., et al; Three-Dimensional Multicomponent Georadar Imaging of Sedimentary Structures; Near Surface Geophysics, In Press, 2005.

\* cited by examiner

ROTARY LASER POSITIONING FOR GEOPHYSICAL SENSING

STATEMENT OF FEDERALLY SPONSORED RESEARCH

This invention was made with United States Government support under grant number 0323213 awarded by the National Science Foundation. The United States Government has certain rights in this invention.

BACKGROUND OF THE INVENTION

1. Field of the Invention

The present invention relates to remote sensing and more particularly to real-time positioning for geophysical sensing.

2. Description of the Related Art

Remote sensing refers to instrument-based techniques in acquiring and measuring spatially organized data derived from a target scene. Remote sensing includes the reduction according to spectral, spatial or physical properties of an array of target points within a scene representative of features, objects, and materials within the sensed scene. The target points generally are acquired through the deployment of one or more recording devices lacking physical, intimate contact with the item under surveillance. Conventional recording devices include sensors utilizing electromagnetic radiation, force fields, or acoustic energy, and are embodied within cameras, gradiometers and scanners, lasers, radio frequency receivers, radar systems, sonar, thermal devices, seismographs, magnetometers, gravimeters, and scintillometers, to name a few.

Geophysical sensing is a subset of remote sensing and relates specifically to the imaging of subsurface objects. Industrial applications of geophysical sensing include subsurface geological surveying, archeological prospection, hydrocarbon exploration hydrologic studies, oceanographic studies, landmine detection, utility detection, and rebar imaging by way of example. Ground Penetrating Radar (GPR) is a well-known geophysical sensing technique utilizing high frequency pulsed electromagnetic waves (typically from 10 MHz to 1,000 MHz) to acquire subsurface information.

In GPR, electromagnetic waves radiate from a transmitting antenna and travel through material in the target scene at a velocity which is determined primarily by the electrical properties of the material. As the wave energy spreads and travels downward towards the target scene, portions of the wave energy impacting a buried object or boundary with different electrical properties than the surrounding material are reflected or scattered back to the surface while the remaining portion of the wave energy continues to travel downward. The wave energy reflected back to the surface can be captured by a receiving antenna, and recorded for later interpretation.

The most common display of GPR data includes a signal travel time versus amplitude view, and is referred to as a trace. A single GPR trace typically consists of the transmitted energy pulse followed by pulses that are received from reflecting objects or layers. A scan is a trace where a color or gray scale has been applied to the amplitude values. As the antenna moves along a survey traverse, a series of traces or scans are collected at discrete points along the line. These scans are positioned side by side to form a display profile of the subsurface.

GPR is well known for its ability to produce highly resolved, subsurface imagery. Yet, conventional GPR applications cannot exploit the full potential of three dimensional GPR imaging due to overly coarse spatial sampling that occurs during data acquisition. Theory and practice show that full resolution three-dimensional GPR imaging requires the un-aliased recording of dipping reflections and diffractions. For a heterogeneous subsurface, in particular, minimum grid spacing of GPR measurements must be at least a quarter of a GPR wavelength or less in all directions. Consequently, positioning precision must be better than an eighth of a wavelength in order to assure correct grid point assignment. Present positioning technologies applied to GPR applications fail to achieve the requisite resolution while maintaining a tolerable speed of data acquisition.

BRIEF SUMMARY OF THE INVENTION

Embodiments of the present invention address deficiencies of the art in respect to positioning for geophysical sensing and provide a novel and non-obvious method, system and apparatus for rotary laser positioning in geophysical sensing. In an embodiment of the invention, a geophysical sensing data processing system can be provided. The system can include multiple laser energy sources disposed about a target scene, and a mobile sensor unit. The mobile sensor unit can include at least one laser energy source sensor coupled to a laser positioning system, and one or multiple geophysical sensor communicatively linked to the laser positioning system.

In one aspect of the invention, the laser positioning system can be a Rotary Laser Positioning System (RLPS) and in another aspect of the invention, the at least one laser energy source can include each of a rotary laser positioning system (RLPS) beam source and an infrared strobe. Complementary positioning sensors further can be provided to act in an auxiliary capacity when the RLPS system cannot provide a requisite level of positioning accuracy, for instance due to short droupouts. The complementary positioning sensors can include by way of example, auxiliary laser sensors, infrared sensors, optical sensors, inertial sensors and global positioning system (GPS) sensors to name only a few.

The system also can include a base station wirelessly linked to the mobile sensor unit in addition to multiple other mobile sensor units. The base station can include program code enabled to merge data subsets of sensed geophysical and corresponding positioning data from the mobile sensor unit and the other mobile sensor units to produce surface and sub-surface imagery of the target scene. In yet another aspect of the embodiment, each of the mobile sensor units further can include a guidance system coupled to a mobile computing platform, and further coupled to the laser positioning system.

Another embodiment of the invention can include a geophysical sensing method. The method can include traversing a target scene while collecting both positioning data computed from laser energy received from laser energy sources disposed about the target scene, and geophysical data sets computed from signals received from a geophysical sensor. In this regard, traversing the target scene further can include navigating a traversal path across the target scene utilizing the positioning data. The method further can include fusing the positioning data with the geophysical data. Finally, the method can include rendering an image of the target scene from the fused positioning data and geophysical data.

In one aspect of the embodiment, fusing the positioning data with the geophysical data can include correlating positioning data with the geophysical data utilizing trigger signals either communicated to the geophysical sensor or to the positioning sensor as the case may be. In an alternative aspect of the embodiment, fusing the positioning data with the geophysical data can include correlating positioning data with the geophysical data according to time stamps applied to each of the positioning data and the geophysical data. In either circumstance, rendering an image of the target scene from the fused positioning data and geophysical data can include data processing and rendering a view of sub-surface features of the target scene using the processed and fused data, all in real-time. Finally, the fused positioning data and geophysical data can be post-processed. Once post-processed, an export data set can be produced.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for rotary laser positioning in geophysical sensing. In accordance with an embodiment of the present invention, one or more rotary laser sources can be placed within a target scene. Corresponding laser energy sensors can be coupled to geophysical sensors such that positioning data computed by the laser energy sensors can be correlated with geophysically sensed data produced by the geophysical sensors to produce an accurate, subsurface three-dimensional view of the target scene with a level of precision not previously available through conventional positioning means.

Figure 1:
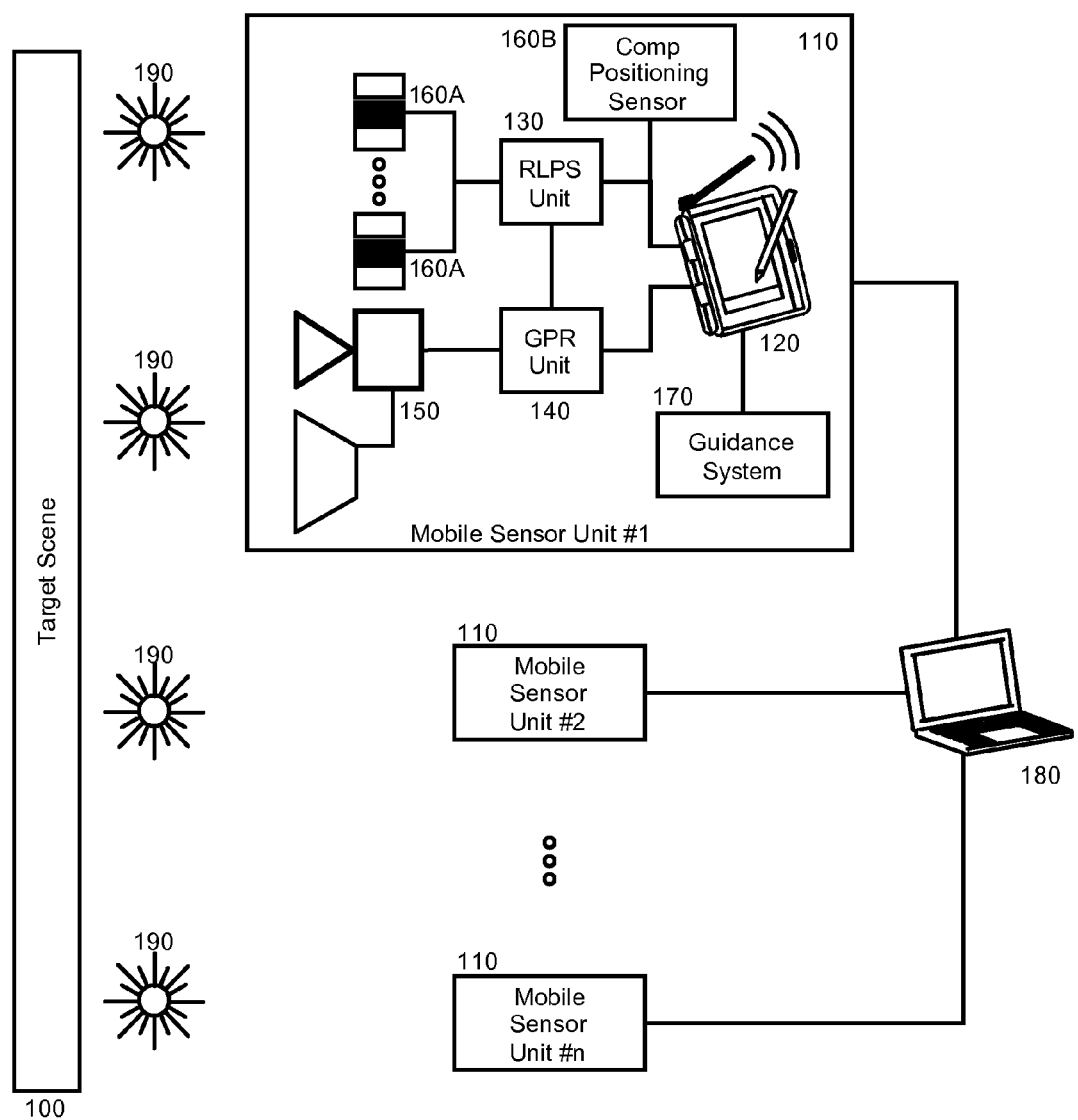
FIG. 1 is a schematic illustration of a data processing system configured for rotary laser positioning for geophysical sensing; and, FIG. 2 is a flow chart illustrating a process for acquiring and reducing geophysically sensed data in the system of FIG. 1.

In illustration of an embodiment of the present invention, FIG. 1 is a schematic illustration of a data processing system configured for rotary laser positioning for geophysical sensing. The system can include one or more laser energy sources 190 disposed about and illuminating a target scene 100. The laser energy sources 190 can include a combination of both rotary scanning laser beam transmitters and infrared strobe pulses, for example. The number of transmitting laser energy sources 190 deployed can vary by the application and need for precision. Generally, by adding multiple laser energy sources 190, survey precision can improve to below one millimeter.

The system also can include one or more mobile sensor units 110. Each mobile sensor unit 110 can include a mobile computing platform 120 coupled to a guidance system 170 enabled to manage the traversal of the target scene 100 while performing geophysical sensing and maintaining an awareness of a precise position at any given time. As such, each mobile sensor unit 110 can include one or more rotary laser positioning sensors 160A coupled to a rotary laser positioning sensor (RLPS) processing unit 130. The RLPS processing unit 130 can include logic enabled to resolve both the position coordinates and the orientation of the mobile sensor unit 110 based upon the receipt of laser energy from a selection of the laser energy sources 190 detected by the rotary laser positioning sensors 160A.

Each of the mobile sensor units 110 further can include a complementary positioning sensor 160B to act in an auxiliary capacity when the RLPS system cannot provide a requisite level of positioning accuracy, for instance due to short dropouts. The complementary positioning sensor 160B can include by way of example, auxiliary laser sensors, infrared sensors, optical sensors, inertial sensors and global positioning system (GPS) sensors to name only a few.

Each of the mobile sensor units 110 further can include a geophysical sensing transmitter and receiver 150. The geophysical sensing transmitter and receiver 150 can be configured to visualize the surface and sub-surface of the target scene 100. To that end, the geophysical sensing transmitter and receiver 150 can include ground penetrating radar, in addition to other possible sensors. Other possible geophysical sensors can include electromagnetic sensors, magnetic sensors, electric sensors, gravimetric sensors, optical sensors and acoustic sensors, to name only a few.

In the embodiment, shown in FIG. 1, the geophysical sensing transmitter and receiver 150 can be ground penetrating radar coupled to a ground penetrating radar processing unit 140. The ground penetrating radar processing unit 140 can be configured to condition incoming signals received through the geophysical sensing transmitter and receiver 150 in order to pass acquired geophysical data to the mobile computing platform 120. In response to receiving geophysical data from the geophysical sensing transmitter and receiver 150, the mobile computing platform can produce either or both of surface and sub-surface imagery of the target scene 100. In order to generate the imagery, mobile computing platform 120 can receive precise positioning data in real-time for the mobile unit 110 and can fuse data from the ground penetrating radar processing unit 140 and the position data of the RLPS processing unit 130.

The real time linkage between the RLPS processing unit 130 and the ground penetrating radar unit 140 can provide real-time positioning for signal data geophysically sensed by the geophysical sensing transmitter and receiver 150 and subsequently processed by the mobile computing platform 120 or by the base station 180. Additionally, the real-time positioning can be used by the guidance system 170 to compare the actual position, orientation, and movement of the mobile sensor unit 110 to the planned position, orientation, and movement of the mobile sensor unit 110.

In order to facilitate a high rate of speed during data acquisition, in the embodiment shown in FIG. 1, the synchronization of the positioning data acquired by the RLPS processing unit 130 with the signal data acquired by the ground penetrating radar processing unit 140 can be a direct trigger, though the skilled artisan will recognize that other synchronization arrangements are possible including time stamping and clock synchronization between the RLPS processing unit 130 and the ground penetrating radar processing unit 140.

Each of the mobile sensor units 110 can be wirelessly coupled to a base station 180. The base station 180 can be configured to wirelessly control, coordinate and supervise data acquisition of one or more of the mobile sensor units 110. The base station 110 can include program code enabled to render a view of the status and location of each of the mobile sensor units 110. The program code of the base station 180 further can render a real-time view of acquired survey data from one or more mobile sensor units 110 during the course of a survey of the target scene 100.

In the latter circumstance, within the view operator selectable geophysical measurement attributes can be plotted as grey scale or color scale values on a map or in one or more three dimensional views at respective fused coordinate positions. By plotting the same sample for all geophysical measurements acquired, a horizontal slice through the data cube can accumulate in the view during the survey of the target scene 100. Consequently, sub-surface features of the target scene 100, in addition to synchronization problems and data gaps can be identified immediately by the operator.

Figure 2:
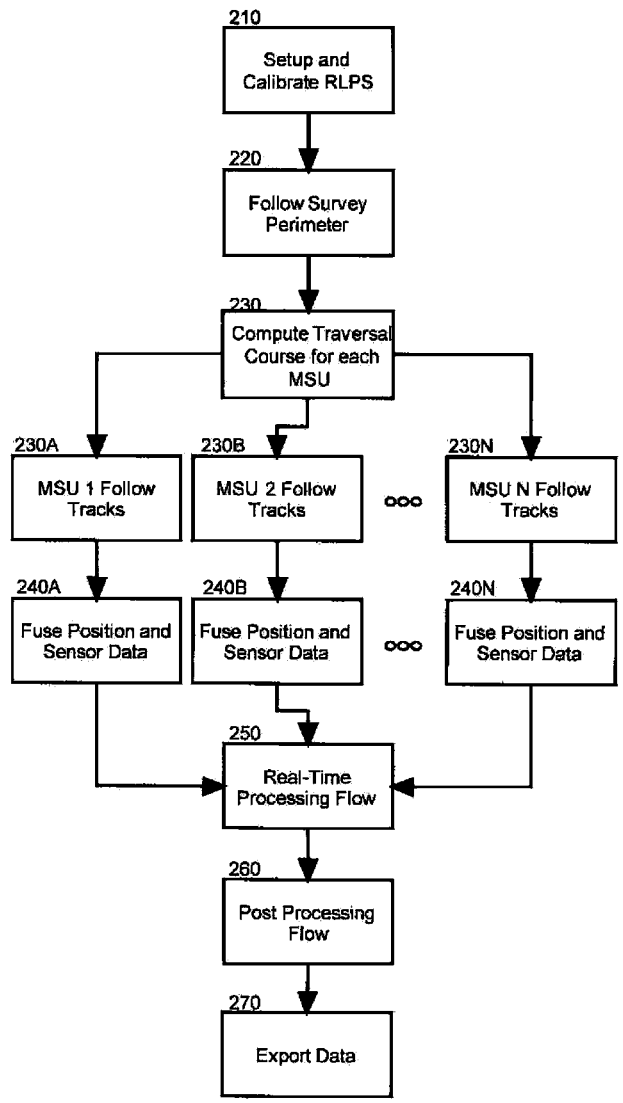

In further illustration of the operation of the invention, FIG. 2 is a flow chart illustrating a process for acquiring and reducing geophysically sensed data in the system of FIG. 1. Beginning in block 210, laser energy source transmitters for the rotary laser positioning system can be placed in the target scene and calibrated for use in providing precise positioning data for one or more mobile sensor units. In block 220, the perimeter of target scene can be followed in order to establish a target scene area. Thereafter, in block 230 a traversal course can be computed for each mobile sensor unit. A typical traversal course can include a single traverse, a set of parallel traverses, a lawnmower pattern, multiple sets of parallel traverses intersecting at an angle, and random walks. The traversal course of a mobile sensor unit can take into account traverse patterns followed by other mobile sensor units for collaboration and collision avoidance.

For each mobile sensor unit, in block 230A, 230B, 230N, the mobile sensor unit can traverse the computed course and in block 240A, 240B, 240N, the position data received from the respective RLPS units can be fused with acquired, geophysically sensed data. In block 250, the fused data can be processed in real time to provide for a real-time view of the survey of the target scene. Subsequently, in block 260, the acquired data can be further enhanced during post-processing of the signal. In the former circumstance, signal processing is kept to a minimum to allow for speed of data acquisition and real-time rendering of the view. In the latter circumstance, more thorough signal processing can be performed to provide for a hi-fidelity view of the target scene.

Examples of realtime processing can include a combination of processing steps for example, bad data rejection, fusion, dewow, frequency filter, time gain, as will be recognized by the skilled artisan. Examples of post processing, by comparison, can include a combination of processing steps such as bad data rejection, fusion with position and other geophysical data, coordinate rotation and translation, regularization, merging, detrend, dewow, frequency filter, time gain, oversampling, subsampling, f(k)-filtering, correlation, averaging, interpolation, smoothing, velocity analysis, semblance analysis, normal moveout correction, three-dimensional migration, Synthetic Aperture Radar (SAR) processing, time-lapse processing, warping, differencing, image processing, image classification, object detection, and animation.

In any event, referring again to FIG. 2, in block 270 the fused and processed data can be exported to a geophysical industry standard data format such as the Society of Exploration Geophysicists Y (SEGY) format or a standard animation data format such as the audio-visual interleave (AVI) format. By utilizing standard formats, the fused and processed data can be processed and visualized for other fields of remote sensing aside from geophysical sensing. Finally, it is to be noted that the process steps of blocks 240, 250, 260 and 270 can be performed centrally, remotely, or in a distributed fashion and can be performed in the mobile computing platform or in the base station, for example.

The skilled artisan will note that several advantages follow the inventive arrangements described herein. First, fast acquisition of densely spaced and uniformly distributed geophysical measurements can be made possible through the simultaneous recording of multiple sensors and the scalable deployment of laser energy sources and mobile sensor units to cover a range of target scenes from the small to the large and of varying grid density. Second, the deployment of multiple mobile sensor units and laser energy sources permits the target scene to vary from a sensing friendly smooth surface to rugged terrain. Third, the precise location of every geophysical measurement point can result in sharp imaging. Fourth, the automated precision guidance of the mobile sensor units permits automated scanning of the target scene with minimal operator input. Finally, the real-time fusion of the location coordinates with the sensed data sets provides for fast image production for visualizing surface and sub-surface imagery.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A geophysical sensing data processing system comprising:

a plurality of laser energy sources disposed about a target scene; and, a mobile sensor unit comprising a positioning sensor coupled to a laser positioning system, and a geophysical sensor communicatively linked to the laser positioning system, the positioning sensor, laser positioning system and geophysical sensor all residing within the mobile sensor unit, the laser positioning system comprising multiple rotary laser positioning sensors all couples to a single processing unit programmed to resolve both position coordinates of the mobile sensor unit based upon a receipt of laser energy from the laser energy sources received by the multiple different rotary laser positioning sensors, the geophysical sensor being configured to visualize a surface and a sub-surface of the target scene.

2. The system of claim 1, wherein the laser energy sources comprise each of a rotary laser beam source and an infrared strobe.

3. The system of claim 1, further comprising a complementary positioning sensor selected from the group consisting of a laser sensor, an infrared sensor, an optical sensor, an inertial sensor, and a global positioning system (GPS) sensor.

4. The system of claim 1, wherein the geophysical sensor is ground penetrating radar.

5. The system of claim 1, wherein the mobile sensor unit further comprises a guidance system coupled to a mobile computing platform, and further coupled to the laser positioning system.

6. The system of claim 5, wherein the mobile computing platform is coupled to the geophysical sensor on the mobile sensor unit and comprises program code enabled to fuse and process geophysical and corresponding positioning data to produce surface and sub-surface imagery of the target scene.

7. The system of claim 1, further comprising a base station wirelessly linked to the mobile sensor unit in addition to a plurality of other mobile sensor units, the base station comprising program code enabled to merge, fuse and process data subsets of sensed geophysical and corresponding positioning data from the mobile sensor unit and the other mobile sensor units to produce surface and sub-surface imagery of the target scene.

* * * * *